(12) United States Patent
Fisher

(10) Patent No.: US 11,697,054 B2
(45) Date of Patent: Jul. 11, 2023

(54) SYSTEM AND METHOD FOR CONDUCTING A PERFORMANCE TEST OF AN ATHLETE

(71) Applicant: Mark Raymond Fisher, New Farm (AU)

(72) Inventor: Mark Raymond Fisher, New Farm (AU)

(*) Notice: Subject to any disclaimer, the term of this patent is extended or adjusted under 35 U.S.C. 154(b) by 714 days.

(21) Appl. No.: 16/699,501

(22) Filed: Nov. 29, 2019

(65) Prior Publication Data

US 2020/0171372 A1    Jun. 4, 2020

(30) Foreign Application Priority Data

Nov. 29, 2018 (AU) ................. 2018904545

(51) Int. Cl.

| A63K 3/02 | (2006.01) |
| G07C 1/22 | (2006.01) |
| A63B 71/06 | (2006.01) |
| A63B 24/00 | (2006.01) |
| A63B 69/00 | (2006.01) |
| G06V 40/20 | (2022.01) |

(52) U.S. Cl.
CPC ...... *A63B 71/0622* (2013.01); *A63B 24/0062* (2013.01); *A63B 69/0028* (2013.01); *A63B 71/0605* (2013.01); *A63K 3/02* (2013.01); *G06V 40/23* (2022.01); *G07C 1/22* (2013.01); *A63B 2071/0627* (2013.01); *A63B 2220/833* (2013.01); *A63B 2225/50* (2013.01)

(58) Field of Classification Search
CPC ........ A63K 3/02; G07C 1/22; A63B 71/0622; A63B 71/0605; A63B 24/0062; A63B 69/0028; A63B 2071/0627; A63B 2220/833; A63B 2225/50; G06V 40/23
See application file for complete search history.

(56) References Cited

U.S. PATENT DOCUMENTS

| 5,897,457 | A | * | 4/1999 | Mackovjak | ............ | A63B 24/00 |
| | | | | | | 482/3 |
| 6,002,336 | A | * | 12/1999 | Widding | ............ | A63B 71/0605 |
| | | | | | | 482/8 |
| 6,072,751 | A | * | 6/2000 | Kirson | ............ | A63B 71/0686 |
| | | | | | | 368/110 |
| 6,298,314 | B1 | * | 10/2001 | Blackadar | ............ | A61B 5/6831 |
| | | | | | | 235/105 |

(Continued)

FOREIGN PATENT DOCUMENTS

WO    2019025313 A1    2/2019

OTHER PUBLICATIONS

Gulsen, M., Smith, A.E., Tate, D.M., A genetic algorithm approach to curve fitting, 1995, vol. 33, No. 7, 1911-1923 (Year: 1995).*

*Primary Examiner* — Jay Trent Liddle
*Assistant Examiner* — Alyssa N Brandley
(74) *Attorney, Agent, or Firm* — Ladas & Parry LLP; Malcolm J. MacDonald, Esq.

(57) ABSTRACT

Performance testing of an athlete uses a gate which provides status indications for the athlete during the test and a sensor which detects movement of the athlete from a start position. A controller communicates with the gate and the sensor to conduct the test. The controller receives athlete movement data and determines first movement characteristics of the athlete at the start position.

15 Claims, 6 Drawing Sheets

(56) References Cited

U.S. PATENT DOCUMENTS

Figure 1:
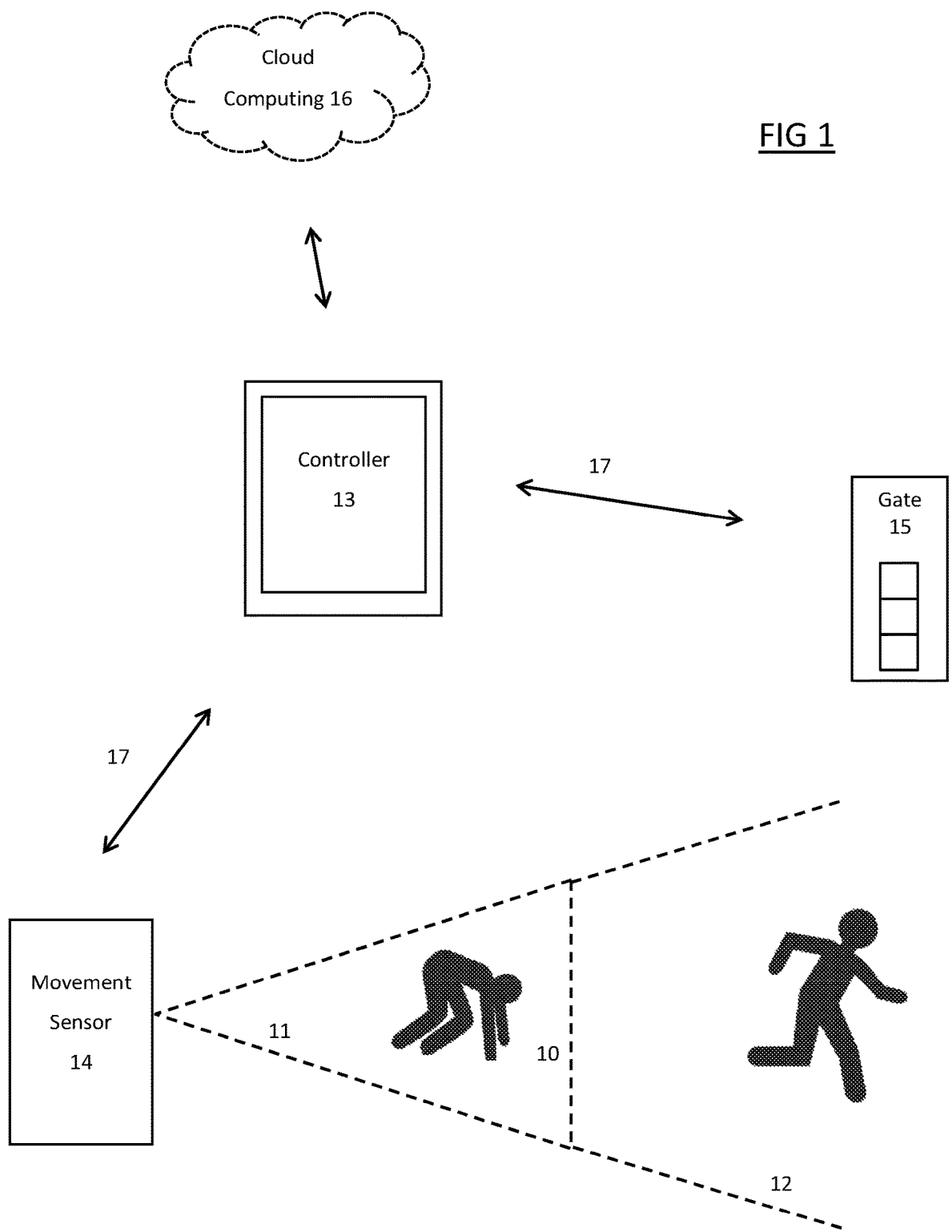

| | | | |
|---|---|---|---|
| 2012/0238407 A1* | 9/2012 | Dilworth | A63B 71/06 |
| | | | 482/8 |
| 2015/0202494 A1* | 7/2015 | Hollenbach | A61B 5/1118 |
| | | | 700/91 |
| 2017/0065871 A1* | 3/2017 | Galli | A63B 24/0062 |
| 2017/0350977 A1* | 12/2017 | Fisher | G01S 15/88 |

* cited by examiner

SYSTEM AND METHOD FOR CONDUCTING A PERFORMANCE TEST OF AN ATHLETE

FIELD OF THE INVENTION

This invention relates to performance testing of athletes, in particular but not only, to accurate timing of the first movement of an athlete in a sprint training exercise.

BACKGROUND TO THE INVENTION

The timing of athletes is a science that requires some attention to detail to ensure that data collected is repeatable, and that systemic errors and variances are kept to a minimum.

Stopwatches were the tool of choice for many years by coaches and the like for determining athlete speeds on a sprint training course. In the past 10-20 years the use of electronic timing gates, involving an interrupted photo beam has also become popular.

The majority of variance in test results occurs when the athlete speed is slow or even zero at the start of a sprint. Many coaches watch carefully for the first movement of an athlete, at which point the coach would press the start button on a stopwatch.

Use of a stopwatch is fraught with error due to visual acuity, proprioception and reaction time of the coach, normally contributing to an error of about 350 ms. Such an error on a 5 m sprint time of about 1.6 seconds is significant at about 18%.

Other devices such as ground based switches and wearable monitors are also available for athletes in these exercises. However, the devices must still be coordinated with a start signal and do not necessarily provide timing accuracy at the start of a sprint, particularly in relation to the first movement of an athlete.

SUMMARY OF THE INVENTION

It is an object of the invention to provide for improved performance testing of athletes, or at least to provide a useful alternative to existing tests.

In one aspect the invention therefore resides in a system for conducting a performance test of an athlete, including: a gate which provides status indications for the athlete during the test, a sensor which detects movement of the athlete from a start position in response to indications from the gate, and a controller which communicates with the gate and the sensor to conduct the test;

wherein the controller receives athlete movement data from the sensor and analyses the data to determine first movement by the athlete at the start position.

The sensor preferably contains a data buffer which records a sequence of time and time-of-flight data points, or time and distance data points, over an interval which starts and finishes respectively before and after first movement by the athlete. The controller analyses data from the sensor by fitting a curve to a sequence of time and distance data points and calculating the time of first movement of the athlete from the start position as determined by a zero distance point on the curve.

In another aspect the invention resides in a method of determining first movement by an athlete at a start position, including: locating the athlete in a start zone, determining that the athlete is stable in a start position in the zone, recording timing data during an interval which starts and finishes respectively before and after the first movement at the start position, and analysing the data by fitting a curve to a sequence of time and distance data points and calculating a time of first movement as determined by a zero distance point or 'x' intercept on the curve.

The athlete is generally provided with audible or visual status indications to the athlete including athlete entry, athlete stable and athlete start signals. The timing data is preferably recorded as a sequence of time and time-of-flight data points, or time and distance data points, with a sample rate of about 20 ms.

LIST OF DRAWINGS

Figure 2:
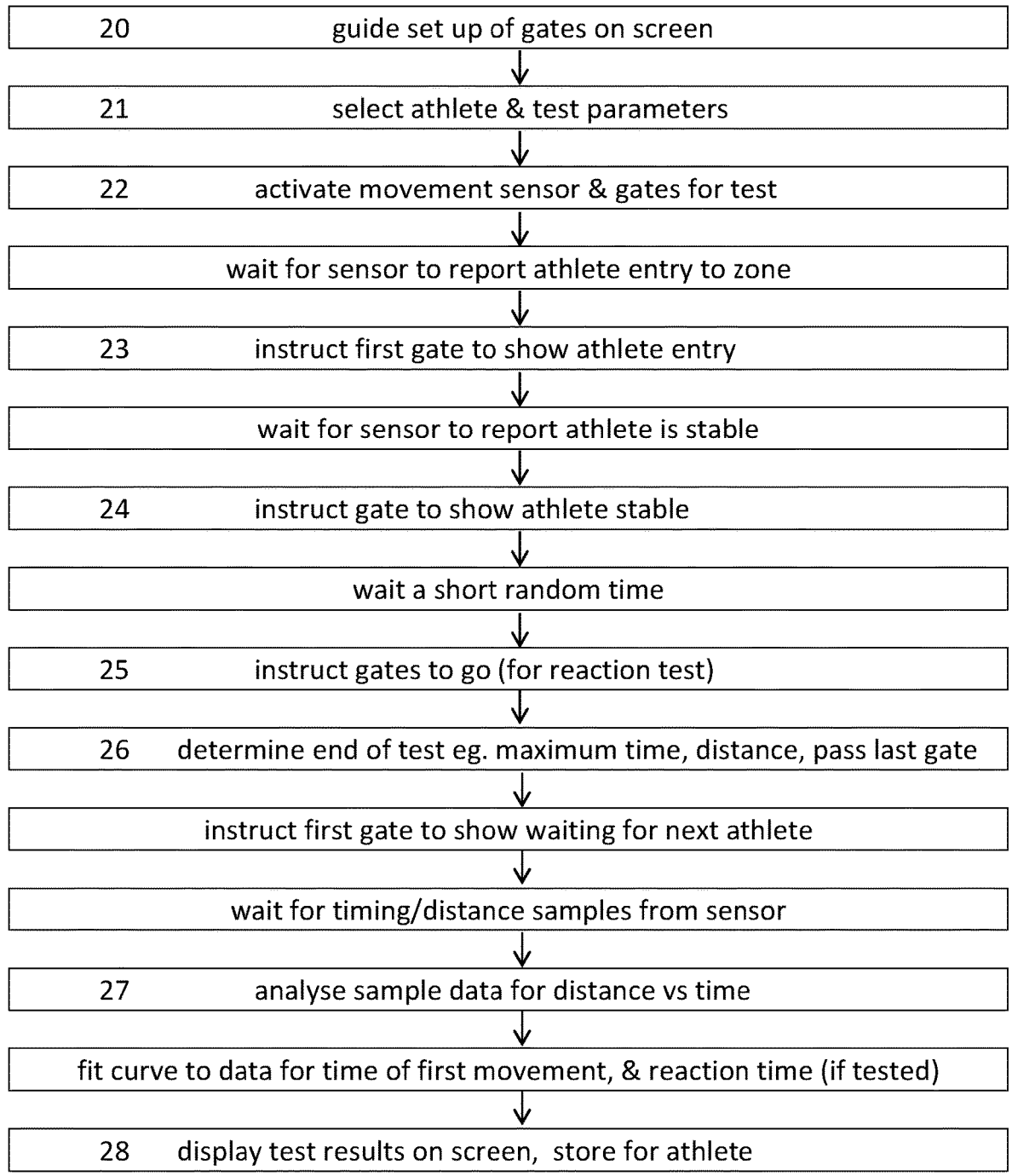
Figure 3:
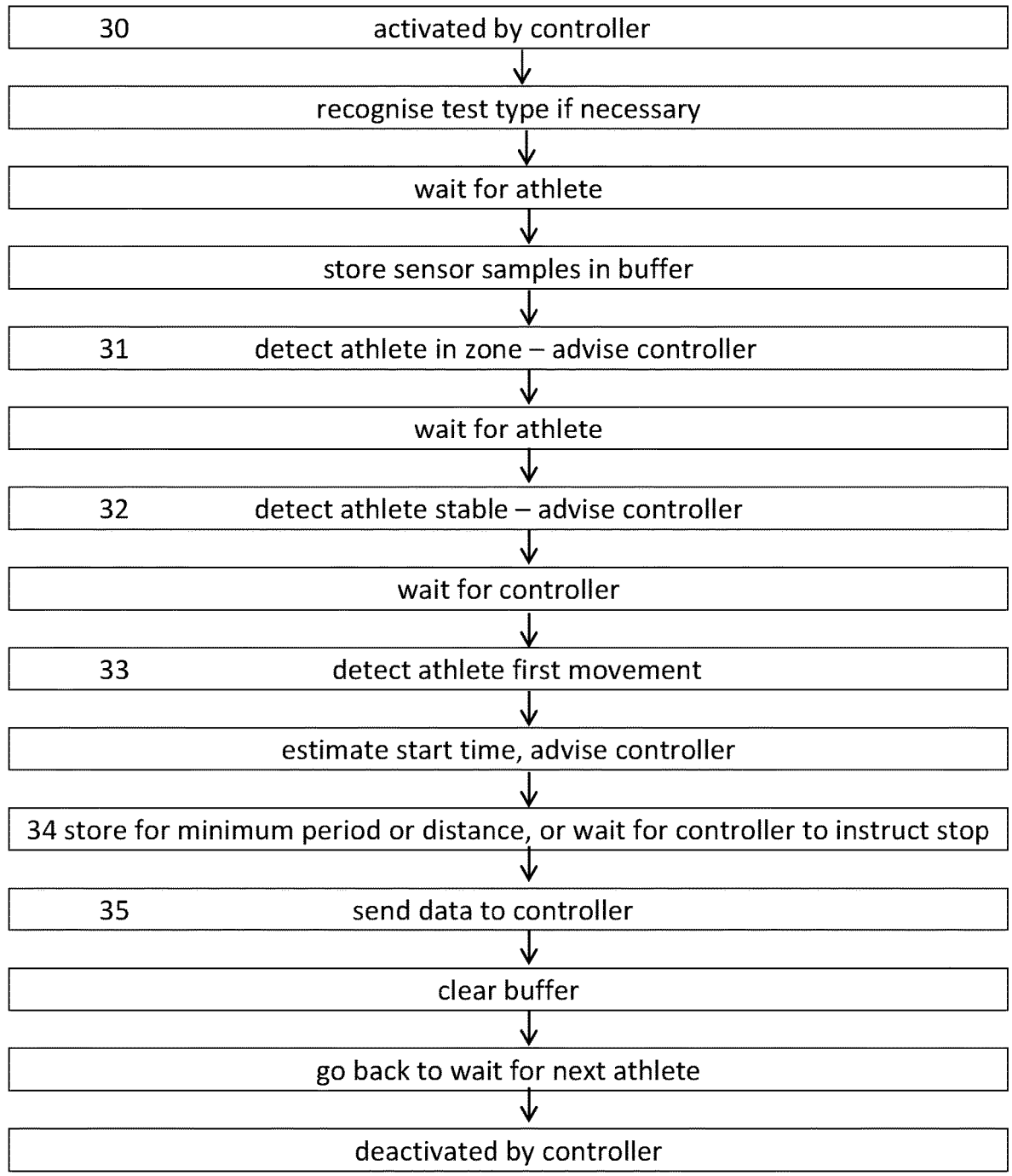
Figure 4:
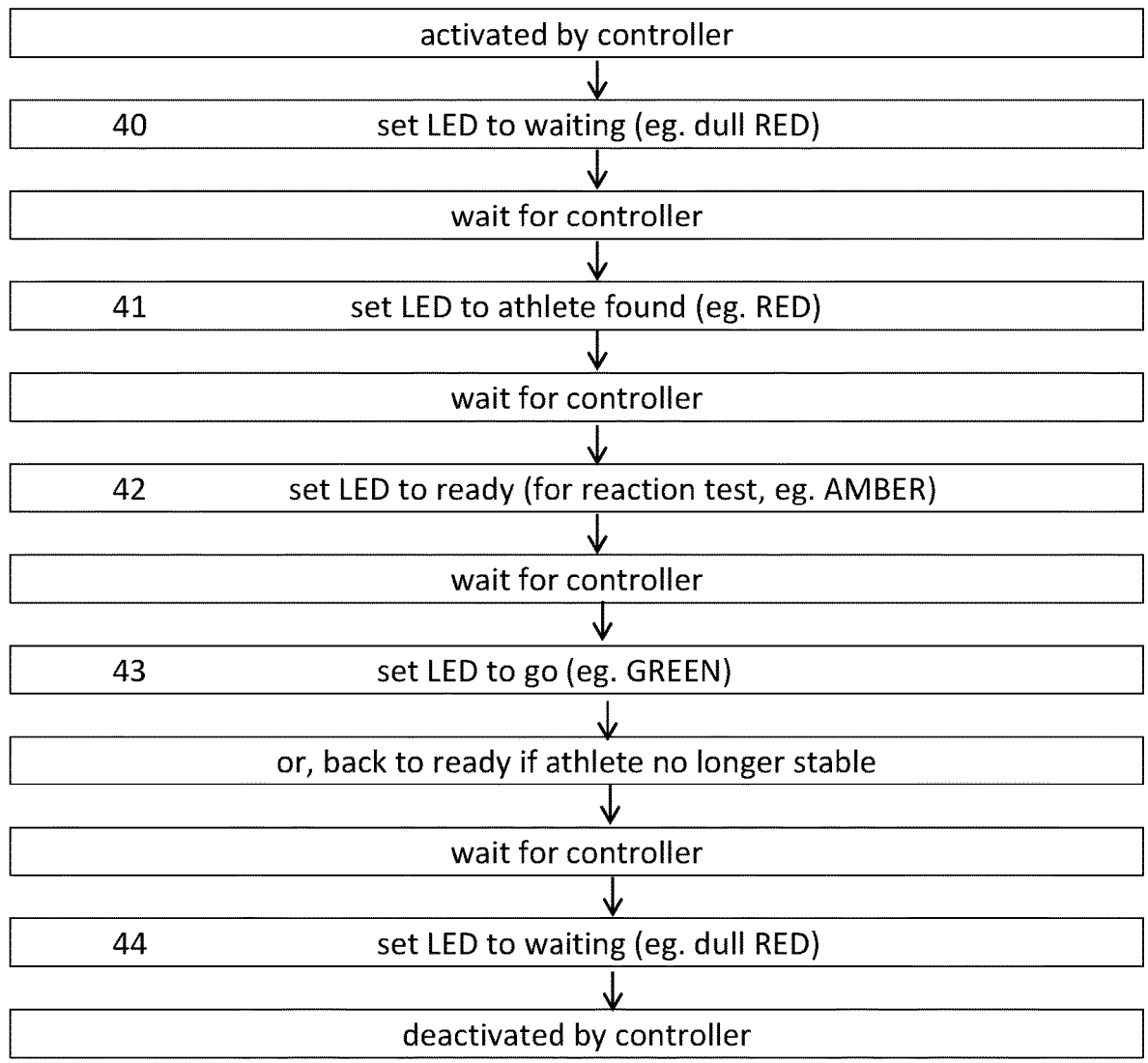
Figure 5:
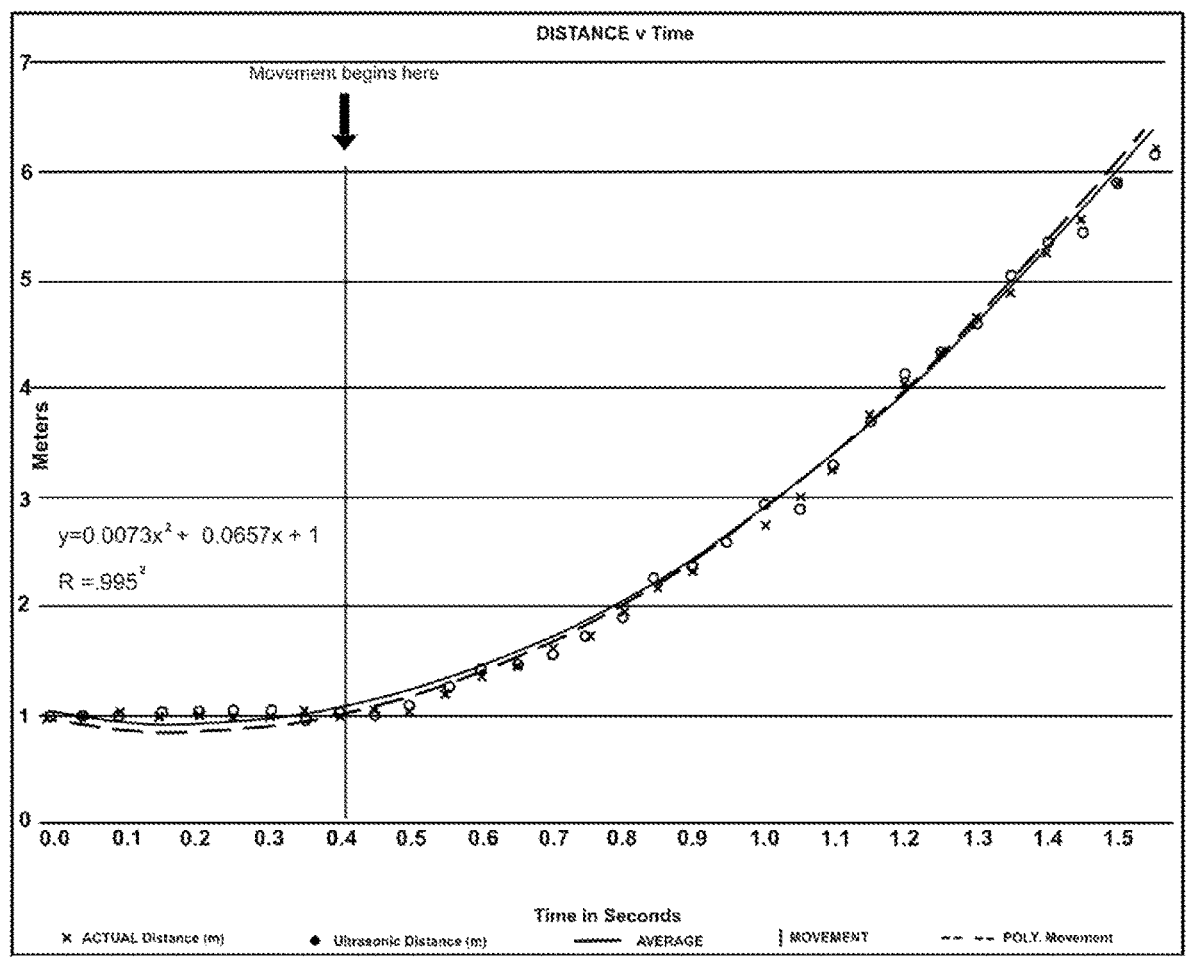
Figure 6:
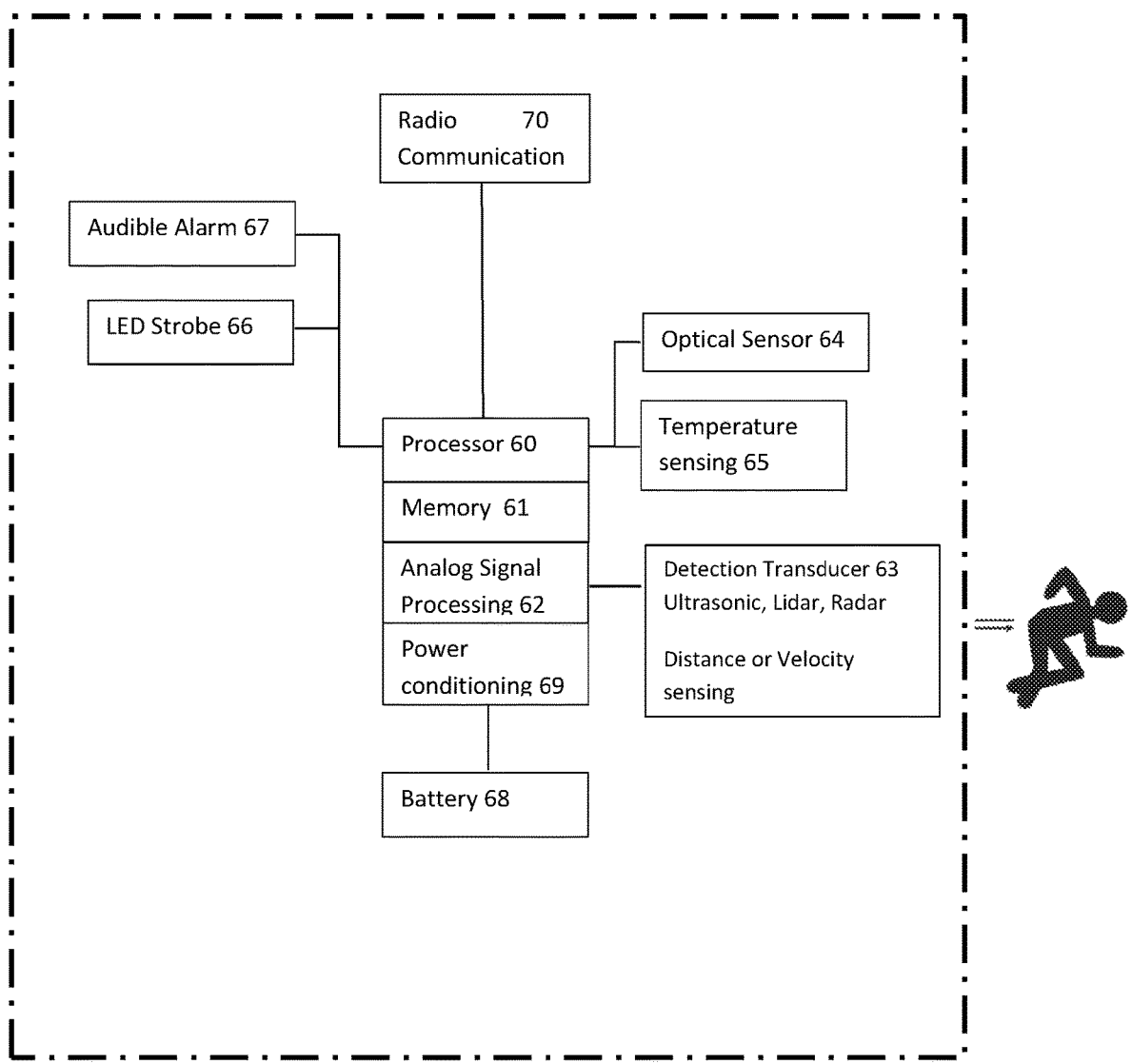

Preferred embodiments of the invention will be described with respect to the accompanying drawings, of which:

FIG. 1 is a schematic layout of a controller, sensor and gate according to one embodiment of the invention, FIG. 2 outlines operation of the controller in FIG. 1, FIG. 3 outlines operation of the sensor in FIG. 1, FIG. 4 outlines operation of the gate in FIG. 1, FIG. 5 shows an example data analysis carried out by the controller, and FIG. 6 shows components of a preferred sensor.

DESCRIPTION OF PREFERRED EMBODIMENTS

Referring to the drawings it will be appreciated that the invention can be implemented in a range of different ways for a variety of different performance tests. The embodiments described here are given by way of example only.

FIG. 1 shows a system of devices being used in a performance test for an athlete 10. The test begins from a start position in start zone 11 with the athlete then sprinting along a short course 12. A handheld controller 13 such as an IPAD is typically used by a coach to conduct the test. A movement sensor 14 is typically located behind the start zone and detects position or movement of the athlete using ultrasound, laser, radar or similar. A timing gate 15 is typically located ahead of the start zone and provides status indications for the athlete using visual and/or audible cues. The gate may be one of a series of gates and may also detect movement of the athlete in more complex tests. Some functions of the gate such as audible signals might also be combined with the sensor in some systems.

A range of different tests can be conducted by the system in FIG. 1, including time of reaction following a start signal, or a sprint time which includes an accurate measurement based on first movement of the athlete. The controller 13 analyses movement data recorded by the sensor 14 and is able to provide the coach with accurate information regarding the athlete's performance at the start of a sprint. Analysis may take place in conjunction with other data and routines which are provided by a cloud computing service 16. The controller typically analyses the data with a curve fitting routine which uses a sequence of data points recorded over an interval before and after first movement by the athlete. It is thought that this routine enables reaction times or start times to be measured with an accuracy of about 10 ms or better.

In FIG. 1 the coach lays out a start zone and positions the sensor 14 and the gate 15 around the zone as required. The coach initiates a test using a screen on the controller which then communicates wirelessly 17 with the sensor and the gate regarding the status of the test. An athlete enters the start zone and is detected by the sensor which reports this event to the controller. The controller instructs the gate to provide one or more status indications for the athlete, typically by way of coloured LEDs. These indications are typically entry, stable and start signals, depending on the nature of the test and the information required by the coach. The sensor records movement data such as time and time-of-flight or time and distance data points while the athlete stabilises in the start zone 11 and then sprints along the course 12.

FIG. 2 outlines operation of the controller 13 in FIG. 1. The controller may first guide 20 the coach on screen to set up a series of one or more gates on the course, such as described in WO 2019/200439. The coach then selects 21 an athlete and desired test parameters from a list of possibilities (eg. time, overall distance, reaction time plus first movement, movement only). Sensor 14 and gate 15 are wirelessly activated 22 by the controller and the athlete is instructed 23 to enter the start zone. The gate may indicate READY as a dull colour. The controller then interacts 24, 25 with the sensor and the gate to provide status indications for the athlete, namely:

ENTRY when the athlete is first detected in the zone eg. a red light

STABLE when the athlete is stable in a start position, eg. an amber light

GO when the athlete has been stable for a short period of time, eg. a green light Data is then recorded by the sensor as described below. In some tests not measuring reaction time for example, a STABLE signal may be sufficient indication for the athlete to start in their own time. The controller determines 26 that the test has finished (or has failed in some way) and receives data from the sensor. Some data conversion may be required depending on the form of the data. Time and time-of-flight may be converted into time and distance data, for example. The data is analysed 27 to determine start time, reaction time, initial acceleration, velocity profiles, first movement characteristics, overall time, or other information as required, and results are presented 28 on screen to the coach. Results and data may also be uploaded to a cloud service.

FIG. 3 outlines operation of the sensor 14 in FIG. 1. The sensor is positioned by the coach and activated wirelessly 30 by the controller 13. A start zone would be defined roughly by near the apex of a horizontal cone in the case of an ultrasound detector, for example. The sensor detects 31 when the athlete has entered the start zone and advises the controller 13. Recording of data into a ring buffer would generally begin at this stage, before the starting movements of the athlete. Ultrasound samples may be recorded every 20 ms for example, with 500 samples being stored in a 10 s buffer. Stability of the athlete is determined 32 by the sensor from the data and would generally be advised to the controller. Stability requires the athlete to be steady in a start position for a predetermined period of time which may include a random variation, but generally less than the size of the buffer.

In FIG. 3 the sensor will typically estimate 33 that the athlete has started to move and then cease recording 34 after a predetermined period. A stable start position would typically be about 1 m from the sensor. A movement of about 50 cm from the stable position would generally be sufficient to determine unambiguously that the athlete has started. This ensures that a range of data over an interval which starts and finishes respectively before and after first movement by the athlete. Data is then transmitted 35 to the controller for analysis and the buffer is cleared for the next athlete.

FIG. 4 outlines operation of the gate 15 in FIG. 1. In this example, the gate provides 40, 41, 42, 43, 44 visible signals to the athlete by way of coloured LEDs. The gate is positioned near the start zone by the coach and activated wirelessly by the controller 13. The sensor 14 typically advises the controller which in turn advises the gate to provide status indications, although the sensor may advise the gate directly or be incorporated in the gate, for some embodiments. A ready indication such as a dull red colour may be provided to the coach, followed by full red when entry of the athlete is detected, amber when the athlete is determined to be stable (and possibly able to start in some tests), and green when the athlete is required to start. The dull red indicates that the system is ready for an athlete.

FIG. 5 illustrates a typical set of time and distance data points, with analysis by the controller 13, for a period of about 2 s and a distance of about 6 m. A simple polynomial has been fitted to the data with x, y axes showing time, distance respectively. In this example the stable start position of the athlete is at a distance of about 1.0 m from the sensor and data from more than about 0.5 s earlier than the estimated start time has been filtered out. The initial data is therefore horizontal at y=1.0 m for about 0.5 s while the athlete is stable. The athlete begins to move at a time between 0.40 s and 0.45 s. In this example, the starting time of about x=0.43 s and position are determined by forcing the curve to pass through a y value equal to the average of the samples to the left of the start time.

Circles represent raw distance measurements from an ultrasound detector. Crosses represent processing of raw values. A quadratic curve $y=ax^2+bx+c$ has been fitted in this case, with c representing the steady state distance of the athlete from the sensor. A radar sensor would generally provide speed data so the analysis would be different. A 5 m sprint might be repeated several times and analysed in this way to determine an average for a particular athlete.

FIG. 6 shows the main components of a preferred movement sensor such as sensor 14 in FIG. 1. The sensor includes a maths processor 60 with a memory 61 for software and data including a ring buffer. A further processor 62 provides for analog processing of signals from one or more transducers. Athlete movements are detected as position or velocity by a transducer 63 which may be ultrasonic, lidar or radar. An optical sensor 64 and temperature sensor 65 may also be provided, so that sound speed in air can be accurately determined in the case of an ultrasonic transducer for example. An LED strobe 66 and/or audible alarm 67 are included to provide indications for the athlete. A battery 68 and power conditioning 69 are provided. A transceiver 70 is provided for radio or other wireless communication as outlined in relation to FIG. 1.

The invention claimed is:

1. A system for conducting a performance test of an athlete, comprising:
   a gate which provides status indications for the athlete during the test,
   a sensor which detects movement of the athlete from a start position in response to indications from the gate, and
   a controller which communicates with the gate and the sensor to conduct the test;
   wherein the controller receives time and time-of-flight data, or time and distance data, from the sensor and analyzes the time and time-of-flight data, or time and distance data, to determine first movement by the athlete from the start position; and
   wherein an analysis of the time and time-of-flight, or time and distance data, by the controller includes fitting of a predetermined curve to a sequence of time and distance data points, and calculating a point of first movement on a fitted curve according to a steady state of the athlete.

2. The system according to claim 1, wherein the sensor contains a data buffer which records a sequence of time and time-of-flight data points, or time and distance data points, over an interval which starts and finishes respectively before and after a first movement by the athlete.

3. The system according to claim 1, wherein the controller analyzes data from the sensor by fitting the curve to a sequence of time and distance data points, and calculating the time of first movement of the athlete from the start position as determined by a point of zero distance from the start position on the curve.

4. The system according to claim 1, wherein the test includes a measurement of time for the athlete to travel a distance from the first movement at the start position to an end position.

5. The system according to claim 1, wherein the gate is a marker device which provides audible or visual signals to indicate "athlete entry", "athlete stable", and "athlete start" status during the test.

6. The system according to claim 1, wherein the sensor is an ultrasound, laser, radar, or video detector which defines a start zone for the athlete.

7. The system according to claim 1, wherein the gate and the sensor are devices separate from the controller and communicate wirelessly with the controller.

8. The system according to claim 1, wherein the predetermined curve is a simple polynomial with parameters which are calculated from the data.

9. The system according to claim 1, wherein the indications from the gate include an indication that the athlete is considered stable and can start when ready.

10. A method of determining first movement by an athlete at a start position, comprising:
locating the athlete in a start zone using a sensor,
determining, using the sensor, that the athlete is stable in a start position in the start zone,
recording time and time-of-flight data, or time and distance data, during an interval which starts and finishes respectively before and after the first movement at the start position using a controller, and
analyzing the time and time-of-flight data, or time and distance data, by fitting a predetermined curve to a sequence of time and distance data points, and calculating a time of first movement as determined by a point of zero distance from the start position on the curve, using the controller.

11. The method according to claim 8, further comprising:
providing audible or visual status indications to the athlete, including "athlete entry", "athlete stable", and "athlete start" signals.

12. The method according to claim 10, wherein the time and time-of-flight data, or time and distance data, is recorded as a sequence of time and time-of-flight data points, or time and distance data points, with a sample rate in of 20 milliseconds.

13. The method according to claim 10, wherein the point of zero distance from the start position is determined from the curve as a steady state of the athlete.

14. The method according to claim 10, wherein the predetermined curve is a simple polynomial with parameters which are calculated from the data.

15. The method according to claim 10, wherein the sensor takes distance-moved or time-of-flight measurements.

* * * * *